(12) United States Patent
Luo et al.

(10) Patent No.: US 9,462,203 B2
(45) Date of Patent: Oct. 4, 2016

(54) CMOS IMAGE SENSOR COMPATIBLE WITH ELECTRICAL SIGNALS OF CCD IMAGE SENSOR, AND IMAGE PROCESSING SYSTEM

(71) Applicant: Brigates Microelectronics (Kunshan) Co., Ltd., Jiangsu (CN)

(72) Inventors: Wenzhe Luo, Jiangsu (CN); Xiujie Hao, Jiangsu (CN); Dexing Dong, Jiangsu (CN)

(73) Assignee: BRIGATES MICROELECTRONICS (KUNSHAN) CO., LTD., Jiangsu (CN)

( * ) Notice: Subject to any disclaimer, the term of this patent is extended or adjusted under 35 U.S.C. 154(b) by 0 days.

(21) Appl. No.: 14/416,820

(22) PCT Filed: Sep. 24, 2012

(86) PCT No.: PCT/CN2012/081816
§ 371 (c)(1),
(2) Date: Jan. 23, 2015

(87) PCT Pub. No.: WO2014/019279
PCT Pub. Date: Feb. 6, 2014

(65) Prior Publication Data
US 2015/0181147 A1    Jun. 25, 2015

(30) Foreign Application Priority Data

Aug. 3, 2012   (CN) .......................... 2012 1 0275124

(51) Int. Cl.
| H04N 3/14 | (2006.01) |
| H04N 5/335 | (2011.01) |
| H04N 5/374 | (2011.01) |
| H04N 5/378 | (2011.01) |

(Continued)

(52) U.S. Cl.
CPC ............ *H04N 5/3741* (2013.01); *H04N 5/353* (2013.01); *H04N 5/374* (2013.01); *H04N 5/376* (2013.01); *H04N 5/378* (2013.01)

(58) Field of Classification Search
CPC .. H04N 5/3728; H04N 5/378; H04N 5/3741; H04N 5/3722

USPC .......................................................... 348/308
See application file for complete search history.

(56) References Cited

U.S. PATENT DOCUMENTS 6,838,715 B1 * 1/2005 Bencuya ............ H01L 27/14609
257/184
2004/0026719 A1 * 2/2004 Barna .................... H01L 27/146
257/222

(Continued)

FOREIGN PATENT DOCUMENTS

| CN | 101155269 A | 2/2002 |
| CN | 1716623 A | 1/2006 |

(Continued)

OTHER PUBLICATIONS

International Search Report dated May 16, 2013 corresponding to PCT/CN2012/08186, 3 pp.

(Continued)

*Primary Examiner* — Antoinette Spinks
(74) *Attorney, Agent, or Firm* — Ohlandt, Greeley, Ruggiero & Perle, LLP

(57) ABSTRACT

An image sensor and an image processing system. The image sensor comprises: a CMOS photosensitive array used for converting an optical signal into an electrical signal; a control signal conversion circuit used for converting into a second control signal a first control signal for driving a CCD photosensitive array to operate, the first control signal at least comprising a vertical transfer signal, a horizontal transfer signal, an electronic shutter signal and a read-out clock signal, and the second control signal at least comprising a column address signal, a row reset control signal and a row read-out control signal; a row selection circuit used for generating a row reset signal according to the row reset control signal and generating a row read-out signal according to the row read-out control signal; and a column selection circuit used for conducting column gating on the CMOS photosensitive array under the control of the column address signal and outputting a column read-out signal. The technical solution of the present invention achieves the compatibility substitution of a CCD image sensor and a CMOS image sensor.

10 Claims, 7 Drawing Sheets

(51) Int. Cl.
*H04N 5/353* (2011.01)
*H04N 5/376* (2011.01)

(56) References Cited

U.S. PATENT DOCUMENTS

| | | | | |
|---|---|---|---|---|
| 2005/0057671 | A1* | 3/2005 | Cole | H04N 9/045 348/273 |
| 2005/0218299 | A1* | 10/2005 | Olsen | H03F 3/08 250/214 A |
| 2005/0219884 | A1* | 10/2005 | Manabe | H01L 27/14609 365/10 |
| 2006/0011807 | A1* | 1/2006 | Lee | H04N 5/3658 250/208.1 |
| 2006/0044412 | A1* | 3/2006 | Neaves | H04N 3/155 348/230.1 |
| 2008/0218598 | A1* | 9/2008 | Harada | H04N 5/2353 348/222.1 |
| 2010/0270459 | A1* | 10/2010 | Augusto | H01L 27/14609 250/208.1 |
| 2011/0216214 | A1 | 9/2011 | Yasuda et al. | |
| 2012/0187304 | A1 | 7/2012 | Ha et al. | |

FOREIGN PATENT DOCUMENTS

| | | |
|---|---|---|
| CN | 1835551 A | 9/2006 |
| CN | 1956491 A | 5/2007 |

OTHER PUBLICATIONS

Written Opinion dated May 16, 2013 corresponding to PCT/CN2012/08186 , 7 pp.

* cited by examiner

CMOS IMAGE SENSOR COMPATIBLE WITH ELECTRICAL SIGNALS OF CCD IMAGE SENSOR, AND IMAGE PROCESSING SYSTEM

CROSS-REFERENCE TO RELATED APPLICATIONS

The present application claims priority to Chinese patent application No. 201210275124.1, filed on Aug. 3, 2012, and entitled "IMAGE SENSOR AND IMAGE PROCESSING SYSTEM", the entire disclosure of which is incorporated herein by reference.

TECHNICAL FIELD

The present disclosure generally relates to image sensor technology, and more particularly, to an image sensor and an image processing system.

BACKGROUND

Image sensors are semiconductor devices which can convert optical signals to electrical signals. Nowadays, the conventional image sensors include Charge-Coupled Device (CCD) image sensors and Complementary Metal Oxide Semiconductor (CMOS) image sensors.

Although both of the CCD image sensors and the CMOS image sensors use photodiodes to convert optical signals to electrical signals, they are formed by different processes and have different structures. After photoelectric conversion, the CCD image sensors apply alternating voltages on adjacent electrodes to form movable potential traps, so that photo induced charges generated at each pixel can be transferred to output ends for detecting. However, the COMS image sensors convert photo induced charges at each pixel into a voltage signal, and then a magnification driving operation and a decoding selecting operation are performed to the voltage signal, such that the photo induced charges generated at the corresponding pixel can be detected.

From an aspect of interface signals, the conventional CCD image sensors are passive devices. Peripheral circuits provide horizontal and vertical CCD drive signals and electronic shutter signals, and then receive image signals from CCD signal output ends. However, the conventional CMOS image sensors are active devices. Peripheral circuits are only used to set parameters, such as exposure time, amplifier gain, etc., through serial interfaces (typically, I2C or SPI). The CMOS image sensors would output image signals after the exposure time elapses. Accompanying with the image signals, synchronization signals for indicating beginnings and endings of the image signals are output, so that downstream chips can correctly receive the image signals.

CCD image sensors include linear CCD image sensors and array CCD image sensors, and the array CCD image sensors are used more widely. A structure diagram of a conventional array CCD image sensor is schematically illustrated in FIG. 1.

Referring to FIG. 1, the array CCD image sensor includes a photography area 10. The photography area 10 includes a plurality of pixel units 20 arranged in rows and columns. Each pixel unit 20 includes a photodiode 23 and a pair of electrodes 24.

FIGS. 2-4 illustrate various types of driving signals required in operations of the array CCD image sensor shown in FIG. 1. Specifically, FIG. 2 illustrates CCD vertical driving signals, FIG. 3 illustrates CCD horizontal driving signals, and FIG. 4 illustrates CCD readout driving signals.

Working processes of the array CCD image sensor shown in FIG. 1 include an exposure step (1), a transfer step (2) and a readout step (3).

In the exposure step (1), photoelectric conversion is performed in the photodiode 23 to convert photons to photo induced charges (e) and store the photo induced charges. Referring to S1 shown in FIG. 1, S1 stands for storage of the photo induced charges. The number of the photo induced charges is proportional to the intensity of the photons.

In the transfer step (2), referring to S21 (vertical transfer) shown in FIG. 1, the photo induced charges are transferred along an adjacent vertical CCD21 to complete vertical transfer under control of the CCD vertical driving signals (Vφ1~Vφ4) shown in FIG. 2. Then, referring to S22 (horizontal transfer) shown in FIG. 1, the photo induced charges are transferred along a horizontal CCD22 under control of the horizontal driving signals (Hφ1~Hφ2) shown in FIG. 3. Transfers of the photo induced charge package in the vertical CCD21 and the horizontal CCD22 depend on alternating voltage pulses (Vφ1~Vφ4 and Hφ1~Hφ2) applied on the CCD electrodes. The alternating voltage pulses form movable potential traps to transfer the photo induced charges.

In the readout step (3), an end of the horizontal CCD22 is connected with a detection circuit. The detection circuit converts the photo induced charge package transferred from the horizontal CCD22 to a voltage signal, and reads the voltage signal using a Correlated Double Sampling (CDS) method (referring to S3 shown in FIG. 3, wherein S3 stands for charge detection). Referring to FIG. 1, the detection circuit may include an amplifier Amp, which is used to read the voltage signal Vout under control of the driving signal φRG. Specifically, as shown in FIG. 4, $V_{FD}$ illustrates the waveform of the CCD signal output voltage, wherein A stands for a reference voltage, B stands for the signal voltage, and the difference between A and B stands for the luminance of the pixel.

FIG. 5 illustrates a structure diagram of a conventional CMOS image sensor. Referring to FIG. 5, signals of ax and ay respectively stand for row and column addresses being operated. There are a plurality of row address (ax), which can be decoded by a row decoder to obtain reset signals (RST0~RSTi), transfer signals (TX0~TXi) and readout strobe signals of each row. P(i, j) in the pixel array stands for a pixel in the $i^{th}$ row and the $j^{th}$ column. After generated in the pixel photodiodes, photo induced charges are converted to voltage signals, and the voltage signals are transferred to detection bit lines (BL0~BLj) according to row strobe operations. Bit lines of all columns are connected with a column decoding and quantification module to perform quantification and row strobe operations, then Dout are output successively. The row strobe signal is obtained by decoding the column address ay.

FIG. 6 illustrates an operation timing diagram of the CMOS image sensor shown in FIG. 5. Typically, the conventional CMOS image sensor works row by row. Namely, in each row, firstly reset is performed, then comes to exposure, and finally read out is implemented.

Referring to FIG. 6, taking the first row as an example, R (1) stands for the reset operation before exposure. After a duration of exposure, Read (1) stands for the readout operation of the first row. R (2) stands for the reset operation before exposure of the second row, and Read (2) stands for the readout operation of the second row. R (3) stands for the reset operation before exposure of the third row, and Read (3) stands for the readout operation of the third row. The entire operation of the second row is shifted a row operation time period after the entire operation of the first row, and the operation of the third row is shifted the same row operation time period after the operation of the second row.

Specifically, when a reset operation is performed on the first row, timing diagrams of the reset signal RST1, the transfer signal TX1 and the readout strobe signal X1 are illustrated as 1A in FIG. 6. When a readout operation is performed on the first row, timing diagrams of the reset signal RST1, the transfer signal TX1 and the readout strobe signal X1 are illustrated as 1B in FIG. 6.

Referring to FIG. 6, timing diagrams of the reset signal RST2, the transfer signal TX2 and the readout strobe signal X2 for the reset operation of the second row are illustrated as 2A in FIG. 6. The same signals for the readout operation of the second row are illustrated as 2B in FIG. 6. Timing diagrams of the reset signal RST3, the transfer signal TX3 and the readout strobe signal X3 for the reset operation of the third row are illustrated as 3A in FIG. 6, and the same signals for the readout operation of the third row are illustrated as 3B in FIG. 6.

Moreover, the readout operation of each row includes a Correlated Double Sampling (CDS) process and an Analog to Digital Conversion (ADC) process. Specifically, referring to FIG. 7, the CDS process includes four steps of RST-SHR-TX-SHS, wherein RST stands for reset before readout, SHR stands for sampling a reset level after resetting a sampling point, TX stands for that charges are transferred to the sampling point, and SHS stands for sampling the signal level after the charges transferred. The difference between the two sampled levels represents the signal after the CDS process. Then, a quantification process is performed on each pixel signal. Pixel signal levels of each row are respectively quantified and read out through column decoding operations.

As shown above, the CCD image sensors and the CMOS image sensors have a great difference not only in structure but also in operation mode. Therefore, it is difficult to achieve compatibility between these two devices. Because of the great technology progress of CMOS image sensors, the CMOS image sensors have replaced the CCD image sensor in many applications. However, the replacement is limited to an overall replacement, rather than a compatible replacement. In some applications, the application environment and the processing system of the CCD image sensors have been fully optimized. The overall replacement is difficult to meet performance requirements, while the compatible replacement is more appropriate. However, there is still no CMOS image sensor which can be compatible with electrical signals of the CCD image sensor.

SUMMARY

The present disclosure aims to solve the problem that there is still no CMOS image sensor which is compatible with electrical signals of the CCD image sensor.

In order to solve the above problems, an image sensor is provided in embodiments of the present disclosure. The image sensor may include: a Complementary Metal Oxide Semiconductor (CMOS) photosensitive array, a row selection circuit, a column selection circuit and a control signal conversion circuit, wherein the CMOS photosensitive array is adapted for converting optical signals to electrical signals;

wherein the control signal conversion circuit is adapted for converting a first set of control signals to a second set of control signals, the first set of control signals are adapted for driving a Charge-Coupled Device (CCD) photosensitive array and comprise at least a vertical transfer signal, a horizontal transfer signal, an electronic shutter signal and a readout clock signal, and the second set of control signals comprises at least a column address signal, a row reset control signal and a row readout control signal;

wherein the row selection circuit is adapted for receiving the row reset control signal and the row readout control signal, generating a row reset signal according to the row reset control signal, and generating a row readout signal according to the row readout control signal, wherein the row reset signal is adapted for controlling a reset operation of each row of the CMOS photosensitive array, and the row readout signal is adapted for controlling a readout operation of each row of the CMOS photosensitive array; and wherein the column selection circuit is adapted for receiving the column address signal, performing a column strobe operation on the CMOS photosensitive array under control of the column address signal, and outputting a column readout signal.

In some embodiments, the control signal conversion circuit may include a first detection unit, a second detection unit, a first counting unit, a second counting unit, a row address acquisition unit, a third counting unit and a column address acquisition unit, wherein the first detection unit is adapted for detecting the electronic shutter signal of the first set of control signals and outputting a reset start signal;

wherein the second detection unit is adapted for detecting the readout clock signal of the first set of control signals and outputting a readout start signal;

wherein the first counting unit is adapted for receiving the reset start signal and the readout start signal, counting the vertical transfer signal to obtain a first count value after receiving the reset start signal, and re-counting the vertical transfer signal after receiving the readout start signal;

wherein the second counting unit is adapted for counting the vertical transfer signal to obtain a second count value after receiving the readout start signal, and re-counting the vertical transfer signal after receiving a next vertical readout start signal;

wherein the row address acquisition unit is adapted for receiving the first count value and the second count value, outputting a row reset control signal according to the first count value, and outputting a row readout control signal according to the second count value;

wherein the third counting unit is adapted for counting the horizontal transfer signal to obtain a third count value after receiving the readout start signal, and re-counting the horizontal transfer signal after receiving a next readout start signal; and wherein the column address acquisition unit is adapted for receiving the third count value, and outputting a column address signal according to the third count value.

In some embodiments, the control signal conversion circuit may includes a first detection unit, a second detection circuit, a first timing unit, a second timing unit, a row address acquisition unit, a third timing unit and a column address acquisition unit, wherein the first detection unit is adapted for detecting the electronic shutter signal of the first set of control signals and outputting a reset start signal;

wherein the second detection unit is adapted for detecting the readout clock signal of the first set of control signals and outputting a readout start signal;

wherein the first timing unit is adapted for detecting the vertical transfer signal after receiving the reset start signal, outputting a first signal and starting to time after detecting a first vertical transfer signal, and stopping timing to obtain a first time interval after detecting a second vertical transfer signal;

wherein the second timing unit is adapted for detecting the vertical transfer signal after receiving the readout start signal, and outputting a second signal after receiving a first vertical transfer signal;

wherein the row address acquisition unit is adapted for receiving the first signal, the first time interval and the second signal, generating a row reset control signal according to the first signal and the first time interval, and generating a row readout control signal according to the second signal and the first time interval;

wherein the third timing unit is adapted for detecting the horizontal transfer signal after receiving the readout start signal, outputting a third signal and starting to time after detecting a first horizontal transfer signal, and stopping timing to obtain a second time interval after detecting a second horizontal transfer signal; and wherein the column address acquisition unit is adapted for receiving the third signal and the second time interval, and generating a column address signal according to the third signal and the second time interval.

Correspondingly, an image processing system is provided in embodiments of the present disclosure. The image processing system may include the image sensor described above.

Compared with the conventional technology, embodiments of the present disclosure have following advantages.

The image sensor of the present disclosure has a CMOS image sensor kernel. A control signal conversion circuit is used to convert a first set of control signals, which are used to driving a CCD image sensor, to a second set of control signals. A row selection circuit and a column selection circuit are used to generate signals for controlling operations of a CMOS photosensitive array according to the second set of control signals. By the above conversion of control signals, the CMOS image sensor can be compatible with a CCD image processing system. Therefore, the CMOS image sensor can be a compatible substitute of the CCD image sensor.

Compared with the CCD image sensor, the CMOS image sensor has advantages of low cost, etc. Therefore, cost of the image sensor and the image processing system of the present disclosure is reduced. Moreover, because the image sensor can be directly used in a CCD image processing system, practicability of the image sensor is improved.

DETAILED DESCRIPTION

As shown above, CCD image sensors and CMOS image sensors have different fabrication processes and basic architectures. Therefore, the CMOS image sensors can only replace the CCD image sensors as a whole, but cannot be a compatible substitute of the CCD image sensors.

However, in some cases, for example, in monitoring systems, the CCD image sensors are used more widely. The CCD image sensors are more sensitive than the CMOS image sensors because complementary color technology is adopted. If the CMOS image sensors are used to replace the CCD image sensors integrally, advantages of the CCD image sensors would be lost. However, if the CCD image sensors are still used, the cost would be high because of fabrication processes and other limitations.

In embodiments of the present disclosure, a CMOS image sensor is used as a kernel, a control signal conversion circuit is used to convert all kinds of driving signals for a CCD image sensor to timing control signals for a CMOS image sensor. Other components, such as analog gain, current and voltage bias, etc, still can be controlled by registers of accessory circuits of the CMOS image sensor. The CMOS image sensor can be a compatible substitute of the CCD image sensor in embodiments of the present disclosure, so that applications of the CMOS image sensor are more flexible. While practicability is improved, cost of the image sensor is reduced.

In order to clarify the objects, characteristics and advantages of the disclosure, the embodiments of the present disclosure will be described in detail in conjunction with the accompanying drawings.

The disclosure will be described with reference to certain embodiments. It will be understood by those skilled in the art that various changes may be made without departing from the spirit or scope of the disclosure. Accordingly, the present disclosure is not limited to the embodiments disclosed.

Figure 8:
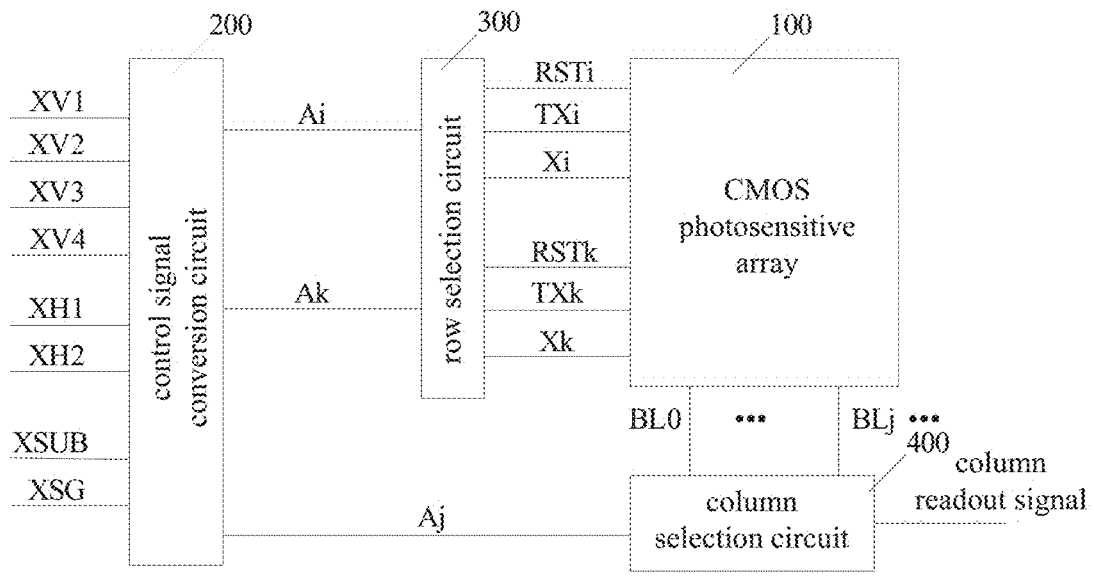
FIG. 8 schematically illustrates a structure diagram of an image sensor according to one embodiment of the present disclosure.

FIG. 8 illustrates a structure diagram of an image sensor according to one embodiment of the present disclosure. Referring to FIG. 8, the image sensor includes a CMOS photosensitive array 100, a control signal conversion circuit 200, a row selection circuit 300 and a column selection circuit 400.

The CMOS photosensitive array is adapted for converting optical signals to electrical signals. In one embodiment, the CMOS photosensitive array 100 has a similar structure to the photosensitive array of the conventional CMOS image sensor. The CMOS photosensitive array 100 may be a conventional four-transistor pixel array, or other CMOS photosensitive array. The present disclosure is not limited thereto.

The control signal conversion circuit 200 is adapted for converting a first set of control signals to a second set of control signals. The first set of control signals are adapted for operating a CCD photosensitive array. The first set of control signals at least include: vertical transfer signals XV1~XV4, horizontal transfer signals XH1~XH2, an electronic shutter signal XSUB and a readout clock signal XSG. The second set of control signals at least include: a row reset control signal Ai, a row readout control signal and a column address signal Aj.

The row selection circuit 300 is connected with the control signal conversion circuit 200, and is adapted for generating row reset signals RSTi, TXi and Xi according to the row reset control signal Ai and generating row readout signals RSTk, TXk and Xk according to the row readout control signal Ak. The row reset signals RSTi, TXi and Xi are adapted for controlling the reset operation of each row of the CMOS photosensitive array 100. The row readout signals RSTk, TXk and Xk are adapted for controlling the readout operation of each row of the CMOS photosensitive array 100.

It should be noted that, in this embodiment, the vertical transfer signal includes a four-phase vertical transfer signal (XV1~XV4) which is commonly used in CCD image sensor, and the horizontal transfer signal includes a two-phase transfer signal (XH1~XH2). However, the present disclosure is not limited thereto. Other CCD control signals, such as a three-phase vertical transfer signal or a four-phase horizontal transfer signal, may be used in the present disclosure.

Referring to FIG. 8, the column selection circuit 400 is connected with the control signal conversion circuit 200, and is connected with the CMOS photosensitive array 100 through detection bit lines BL0~BLj. The column selection circuit 400 is adapted for receiving the column address signal Aj of the second set of control signals, and under control of the column address signal Aj, performing a column strobe operation on the CMOS photosensitive array 100 and outputting a column readout signal.

In one embodiment, the row selection circuit 300 may use a row decoder or a shift register to perform row operations. The column selection circuit 400 may use a column decoder or a shift register to perform column operations.

Moreover, in some embodiments, the readout signal output by the image sensor may be a digital signal after an Analog/Digital (A/D) conversion, or an analog signal without an A/D conversion. The present disclosure is not limited thereto. Preferably, because an A/D converter can be easily integrated on a same chip of the image sensor in the CMOS technology, it is more convenient for system integration if the image sensor output a digital signal.

In some embodiments, the image sensor may further include accessory circuits, such as a reference voltage or current source, a charge pump, a voltage regulator, etc. The image sensor may further include registers for controlling, communication interfaces (such as the commonly used serial interfaces: I2C, SP1, etc.) for the registers, other control logics, image pre-processing circuits, etc. These accessory circuits may be similar to corresponding circuits of conventional CMOS image sensors, and are not described in detail herein.

As described above, the conventional CMOS image sensors are active devices. The exposure times, analog amplifier gains and other parameters are stored in their control registers. After the CMOS photosensitive array is exposed, each row may be read out successively. When a row is reading out, each pixel in the row is reading out successively. The present reading row and the present reading pixel are determined by the row selection circuit and the column selection circuit. Addresses of the selected row and the selected column or shift registers are determined by an internal timing control logic.

Specifically, at the moment of reading a frame, the frame synchronization signal (FRAME_VALID) goes high until the frame has been read out completely. At the moment of reading a row and outputting valid data of the row, the row synchronization signal (LINE_VALID) goes high. Therefore, downstream receiving ends can receive the image data correctly according to the frame synchronization signal and the row synchronization signal.

In the operation process of the conventional CMOS image sensor, the control registers is written by an external serial port. After the CMOS image sensor starts to work, signals of control, timing and sequence of address are generated by internal control machine.

In the image sensor according to embodiments of the present disclosure, a conventional CMOS photosensitive array is employed as its kernel, timing control of the CMOS photosensitive array is obtained from the control signal conversion circuit by converting the CCD vertical transfer signals XV1~XV4, the horizontal transfer signals XH1~XH2, the electronic shutter signal XSUB and the readout clock signal XSG. Other control circuits, such as analog amplifier, current or voltage bias, etc, can be controlled by accessory circuits. Therefore, the CMOS image sensor can be a compatible substitute of a CCD image sensor.

Figure 9:
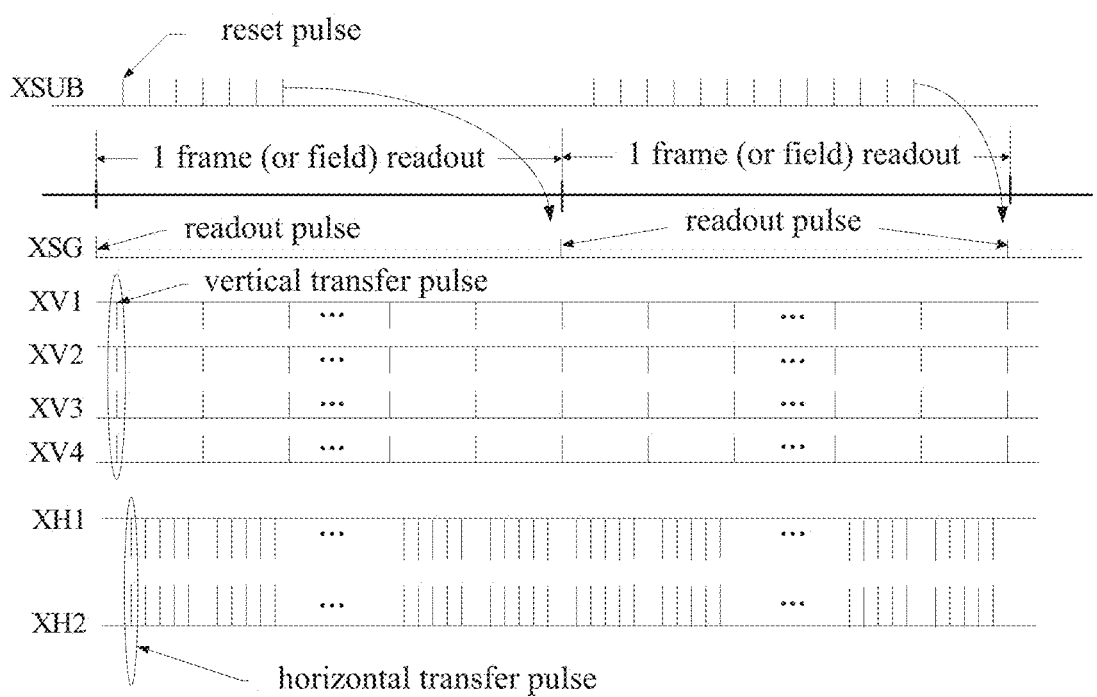
FIG. 9 schematically illustrates a timing diagram of a first set of control signals according to one embodiment of the present disclosure.

FIG. 9 illustrates a timing diagram of the first set of control signals according to one embodiment of the present disclosure. Referring to FIG. 9, the time interval between two adjacent readout pulses of the readout clock XSG is one frame (or field) readout time. In one frame, there may be one, two or more than two electronic shutter signals XSUB. In the CCD, the electronic shutter signal XSUB is turned on to make photo induced charges of photosensitive diodes overflow vertically. The readout clock signal XSG starts transfer operation from the photosensitive diode to the vertical CCD, and resets the photosensitive diode.

After converted by the control signal conversion circuit, each reset pulse of the electronic shutter signal XSUB may start a reset operation of the first row of the CMOS photosensitive array. If there are multiple reset pulses, the last reset pulse is a valid pulse. Namely, the last reset pulse invalids previous reset operations, and resets the first row again. After the first row of the CMOS photosensitive array is reset by the reset pulse, subsequent rows may be reset by the CMOS row selection circuit according to passage time of each row.

After converted by the control signal conversion circuit, the readout pulse of the readout clock signal XSG may start a readout operation of the first row of the CMOS photosensitive array. Then, subsequent rows may be read out according to a passage time of each row.

The passage time of each row is determined by the vertical transfer signal of the CCD. Referring to FIG. 9, in the CCD, the vertical transfer signal works periodically to transfer each row's signal to the horizontal CCD successively for reading out. Because the four-phase vertical transfer signal has a same number of vertical transfer pulses in each frame, the number of pulses of one phase of the four-phase vertical transfer signal can be counted in the control signal conversion circuit of the present disclosure. The count value can be used to determine the reset row, the transfer row and the readout row, and the rows are selected by the CMOS row selection circuit.

In the CCD, the horizontal signal works periodically to transfer a signal of each pixel successively to a detection end for detecting. Similarly as the vertical transfer signal, the two-phase horizontal transfer signal has a same number of horizontal transfer pulses. Therefore, the number of pulses of one phase of the two-phase horizontal transfer signal can be counted in the control signal conversion circuit of the present disclosure. The count value can be used to determine a pixel to read out, and the column selection circuit (for example, a column decoder or a shift register) is used to select and read the pixel.

Figure 10:
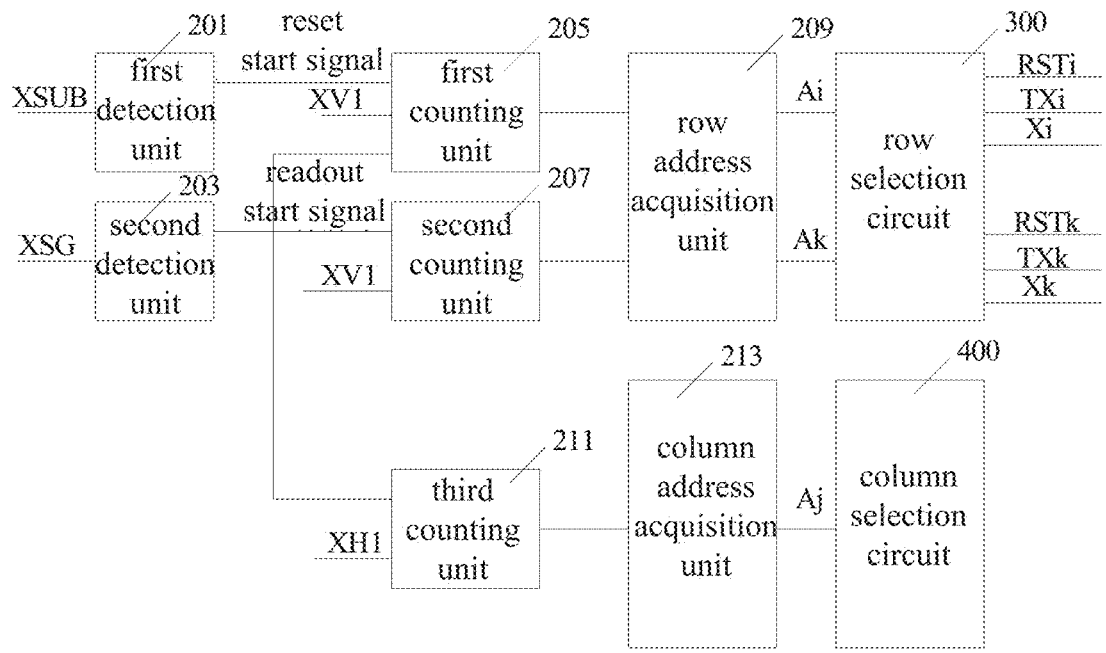
FIG. 10 schematically illustrates a structure diagram of a control signal conversion circuit according to one embodiment of the present disclosure.

In order to clarify the conversion of the above control signals, FIG. 10 illustrates a structure diagram of the control signal conversion circuit shown in FIG. 8 according to one embodiment of the present disclosure. Referring to FIG. 10, the control signal conversion circuit may include a first detection unit 201, a second detection circuit 203, a first counting unit 205, a second counting unit 207, a row address acquisition unit 209, a third counting unit 211 and a column address acquisition unit 213.

The first detection unit 201 is adapted for detecting the electronic shutter signal XSUB in the first set of control signals and outputting a reset start signal.

The second detection unit 203 is adapted for detecting the readout clock signal XSG in the first set of control signals and outputting a readout start signal.

The first counting unit 205 is connected with the first detection unit 201 and the second detection unit 203, and is adapted for receiving the reset start signal and the readout start signal, counting the vertical transfer signal to obtain a first count value after receiving the reset start signal; and re-counting the vertical transfer signal after receiving the readout start signal. The "re-count" herein refers to that the count value of a previous frame time is set to zero in the present frame time, and the number of the vertical transfer signal is re-counted.

Specifically, the frame time is determined by two adjacent readout clock signals XSG. The number of the vertical transfer signal is re-counted in another frame time. In this embodiment, the first counting unit 205 only counts one phase of the four-phase vertical transfer signal (for example, XV1). Of course, in other embodiments, other phases of the vertical transfer signal (for example, XV2~XV4) may be counted. The present disclosure is not limited thereto.

Moreover, if there are multiple electronic shutter signals XSUB, the first detection unit 201 may output multiple reset start signals. In this way, the first detection unit 205 may count more than one time under control of the multiple reset start signals until outputting a valid first count value under control of the last reset start signal.

Taking a frame time which has three electronic shutter signals XSUB as an example, the first detection unit 201 outputs a first reset start signal, a second reset start signal and a third reset start signal. When receiving the first reset start signal, the first counting unit 205 may count the vertical transfer signal XV1, and obtain the first counting values "1", "2" and "3". If the first counting unit 205 receives the second reset start signal after obtaining "3" of the first counting values, the first counting unit 205 re-counts the vertical transfer signal XV1, and obtains the first counting values "1", "2", "3", "4" and "5" of a second time. At this time, if the third reset start signal is received, the first counting unit 205 re-counts the vertical transfer signal XV1 again, and obtains the first counting values "1", "2", "3", "4", "5", "6" . . . of a third time. Because there is not another reset start signal received in the frame time, the first counting value of the third time is a valid first counting value, while the previous two first counting values are invalid.

After obtained by the row address acquisition unit 209, the first counting values "1", "2", "3", "4", "5", "6" . . . are used to generate corresponding row reset control signals of the first row, the second row, the third row, the fourth row, the fifth row, the sixth row, . . . , respectively. All of the above reset control signals constitute the row reset control signal Ai, wherein i=1, 2, 3, 4, . . . . In other words, the row reset control signal Ai corresponds to the addresses of the CMOS photosensitive array from the first row to the last row.

The second counting unit 207 is connected with the second detection unit 203, and is adapted for receiving the readout start signal, counting the vertical transfer signals to obtain a count value after receiving the readout start signal, and re-counting the vertical transfer signal after receiving a next readout start signal.

Similarly as the first counting unit 205, the second counting unit 207 only counts one phase of the four-phase vertical transfer signal (for example, XV1) in one frame time, and re-counts in a new frame time. It should be noted that, the first counting unit 205 and the second counting unit 207 can count the same phase vertical transfer signal (for example, XV1), or count different phase vertical transfer signals. The present disclosure is not limited thereto. Moreover, similarly as the first counting unit 205, the second count value generated by the second counting unit 207 corresponds to the row readout control signal of each row.

The column address acquisition unit 209 is connected with the first counting unit 205 and the second counting unit 207, and is adapted for receiving the first count value and the second count value, outputting the row reset control signal Ai after receiving the first count value, and outputting the row readout control signal Ak after receiving the second count value, wherein k=1, 2, 3, 4, . . . .

Similarly as the row reset control signal Ai, the row readout control signal Ak also includes the row readout control signal of the CMOS photosensitive array 100 from the first row to the last row.

The row selection circuit 300 is connected with the row address acquisition unit 209, and is adapted for receiving the row reset control signal Ai and the row readout control signal Ak, outputting the row reset signals (RSTi, TXi and Xi as shown in FIG. 10) according to the row reset control signal Ai, and generating the row readout signal (RSTk, TXk and Xk as shown in FIG. 10) according to the row readout control signal Ak.

The row reset signal is adapted for controlling reset operation of each row (from the first row to the last row) of the CMOS photosensitive array. The row readout signal is adapted for controlling readout operation of each row (from the first row to the last row) of the CMOS photosensitive array.

Figure 11:
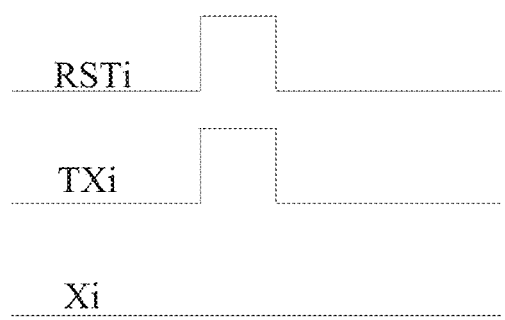
FIG. 11 schematically illustrates a timing diagram of a row reset signal according to one embodiment of the present disclosure.
Figure 12:
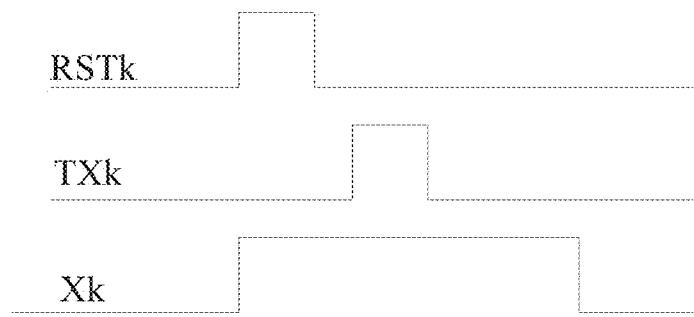
FIG. 12 schematically illustrates a timing diagram of a row readout signal according to one embodiment of the present disclosure.

A timing diagram of the row reset signal is shown in FIG. 11, and a timing diagram of the row readout signal is shown in FIG. 12. Specifically, each row of the CMOS photosensitive array is reset successively under control of the row reset signal, then is exposed before the row readout signal, and finally is read out under control of the row readout control signal.

Referring to FIG. 10, the third counting unit 211 is adapted for counting the horizontal transfer signal (for example, XH1) in one frame time, and obtaining a third count value. The third count value is transmitted to the column address acquisition unit 213.

The column address acquisition unit 213 is adapted for obtaining the column address signal Aj for operating the CMOS photosensitive array 100 according to the received third count value. The column address signal Aj is transmitted to the column selection circuit 400 for decoding, so as to read out a corresponding pixel of the CMOS photosensitive array 100.

Specifically, the third counting unit 211 is connected with the second detection unit 203, and is adapted for receiving the readout start signal, counting the horizontal transfer signals after receiving the readout start signal, and re-counting the horizontal transfer signals after receiving a next readout start signal.

In this embodiment, the third counting unit 211 is adapted for counting the horizontal transfer signal XH1. In other embodiments, the third counting unit 211 also can be adapted for counting other horizontal signals, such as XH2. The present disclosure is not limited thereto.

Hereunder, working principle of the image sensor of the present disclosure will be described in detail in conjunction with the accompanying drawings of FIGS. 8-12.

Referring to FIG. 10, at a first time t1, the first detection unit 201 outputs a valid reset start signal after detecting the electronic shutter signal XSUB. The first counting unit 205 starts to count the vertical transfer signal XV1 based on the valid reset start signal and obtains a first counting values "1", "2", "3", . . . .

After receiving the above first counting values, the column address acquisition unit 209 generates corresponding reset control signals of the first row, the second row, the third row . . . .

The column selection circuit 300 generates row reset signals of the first row, the second row, the third row . . . successively according to the above row reset control signals. Timing diagrams of the above row reset signals are illustrated in FIG. 11.

Referring to FIG. 8, the CMOS photosensitive array 100 performs a reset operation row by row under control of the above row reset signal. That is, the first row of the CMOS photosensitive array is reset at the first time t1, the second row of the CMOS photosensitive array is reset after a row period, and so on until all rows of the CMOS photosensitive array are reset. The row period is determined by a time interval between two adjacent vertical transfer signals.

At a second time t2, the second detection unit 203 detects the readout clock signal XSG, and outputs a readout start signal. The second counting unit 207 counts the vertical transfer signal XV1 based on the readout start signal, and outputs the second count values "1", "2", "3" . . . .

The row address acquisition unit 209 outputs corresponding row readout control signals of the first row, the second row, the third row . . . when receiving the above second count values.

The row selection circuit 300 generates row readout signals of the first row, the second row, the third row . . . successively according to the above row readout control signal. Timing diagrams of the above row readout signals are illustrated in FIG. 12.

A row by row readout operation is performed on the CMOS photosensitive array 100 from the first row under control of the above row readout signal. That is, the first row of the CMOS photosensitive array is read out at the second time t2. A subsequent row is read out after its previous row a row period.

Figure 1:
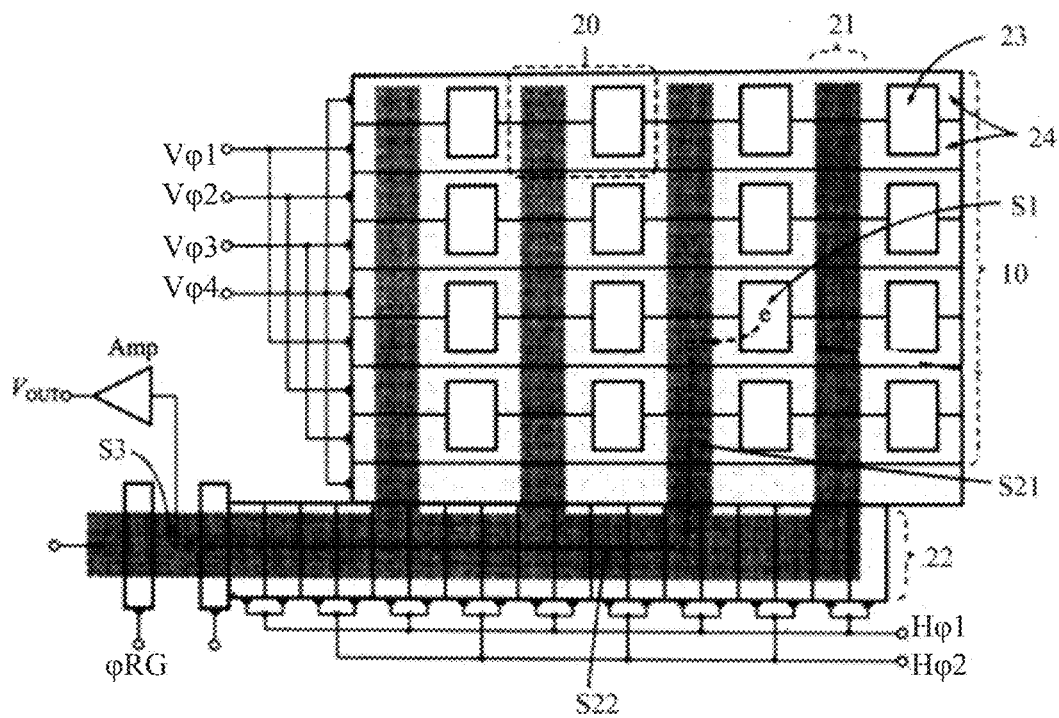
FIG. 1 schematically illustrates a structure diagram of a conventional array CCD image sensor.
Figure 2:
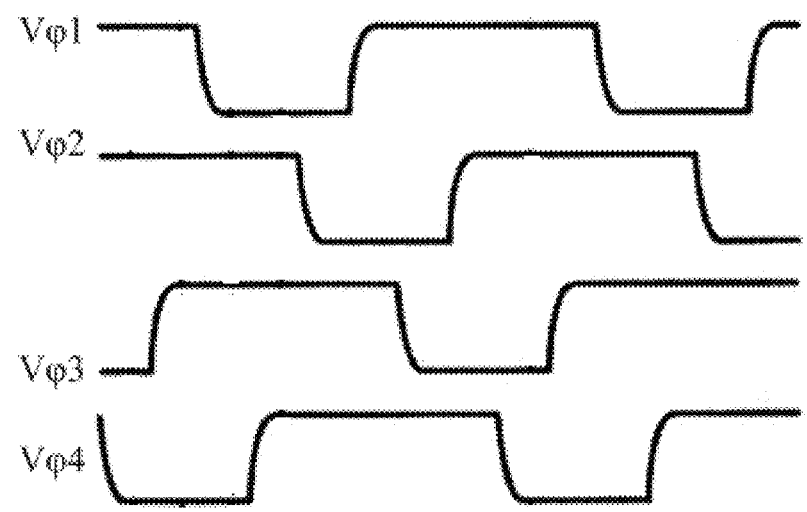
FIG. 2 schematically illustrates diagrams of CCD vertical driving signals of the array CCD image sensor shown in FIG. 1.
Figure 3:
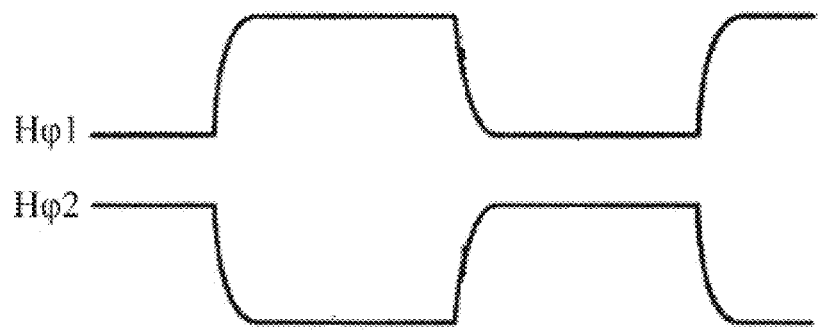
FIG. 3 schematically illustrates diagrams of CCD horizontal driving signals of the array CCD image sensor shown in FIG. 1.
Figure 4:
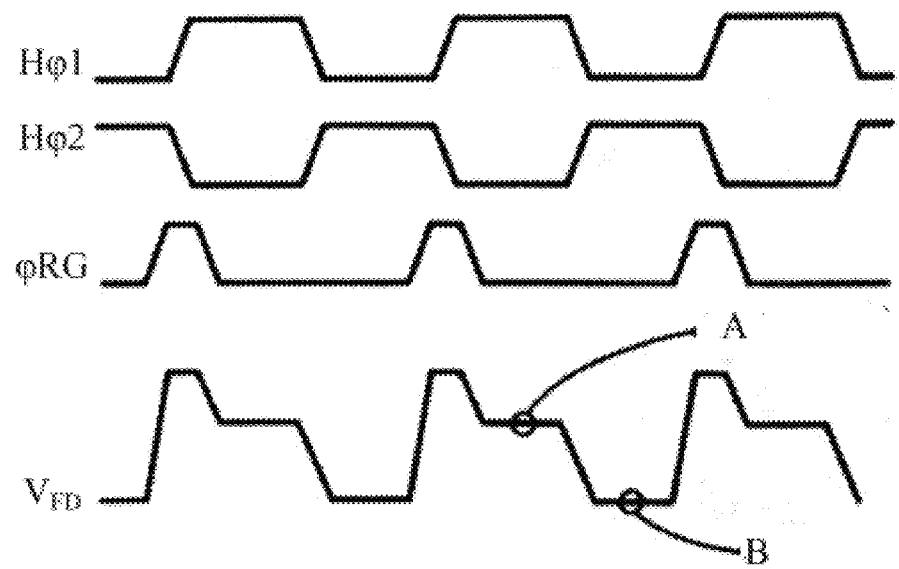
FIG. 4 schematically illustrates diagrams of CCD readout driving signals of the array CCD image sensor shown in FIG. 1.
Figure 5:
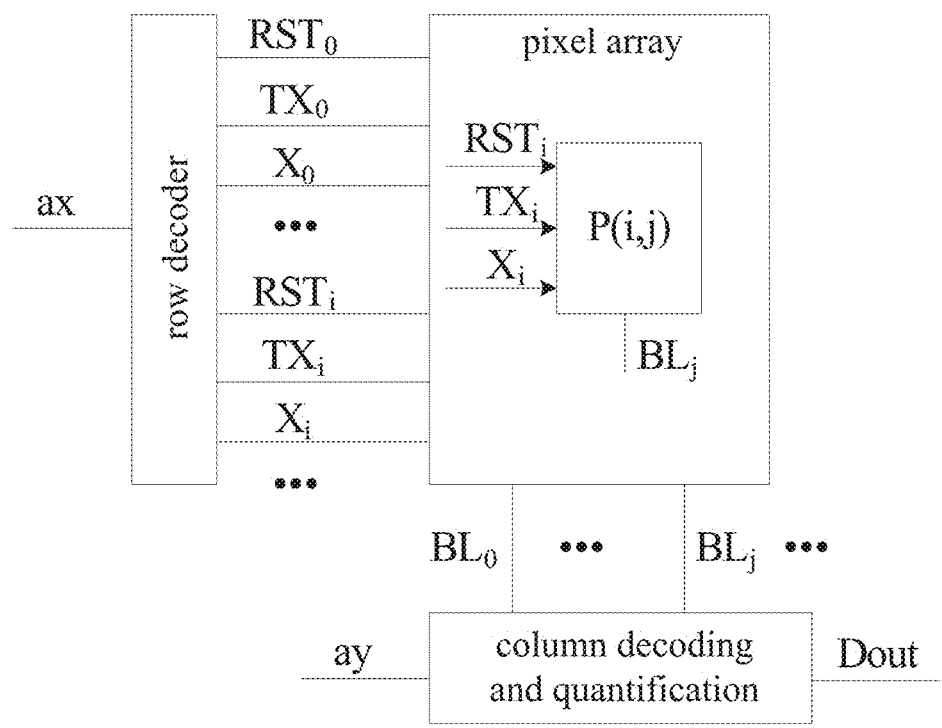
FIG. 5 schematically illustrates a diagram of a conventional CMOS image sensor.
Figure 6:
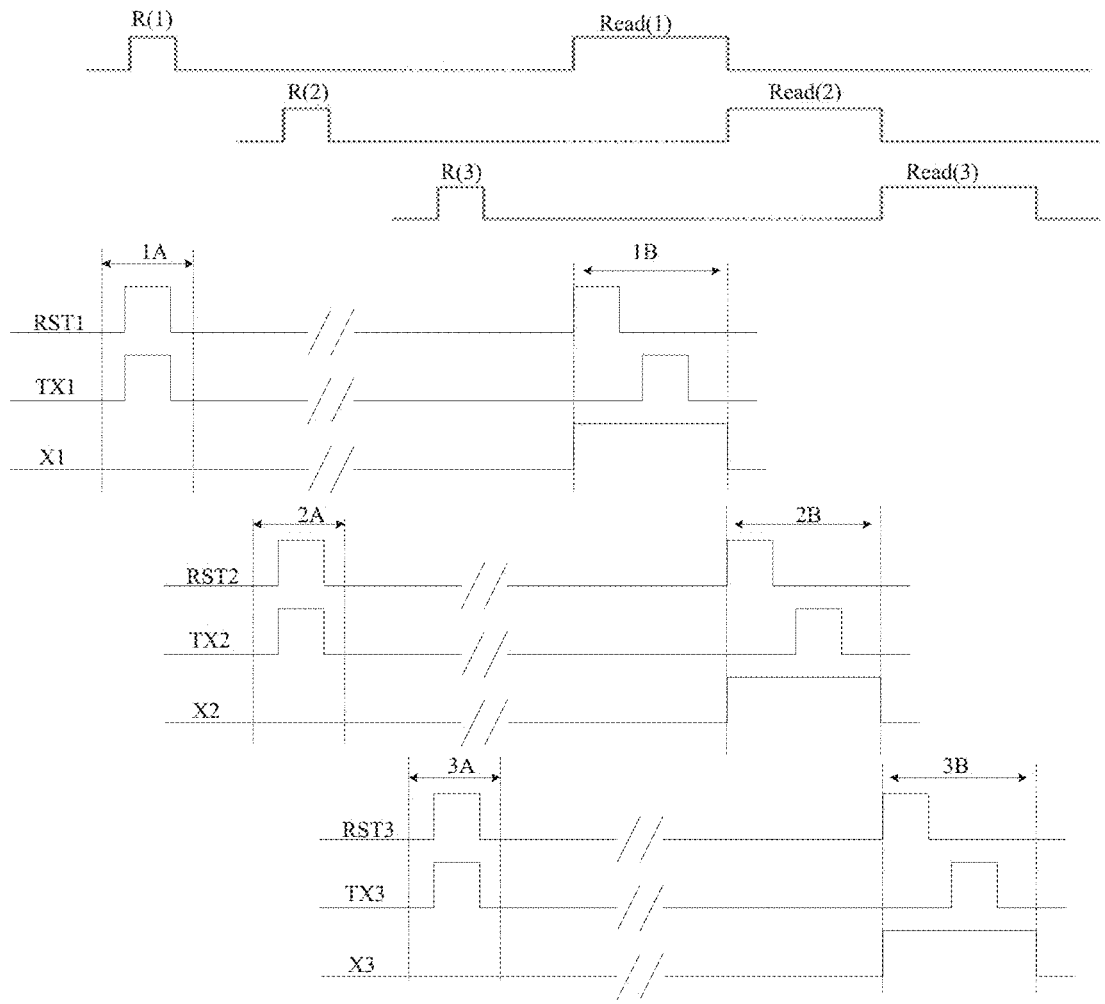
FIG. 6 schematically illustrates operation timing diagrams of the CMOS image sensor shown in FIG. 5.
Figure 7:
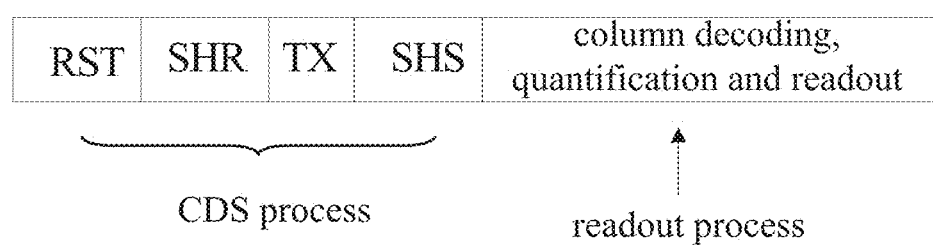
FIG. 7 schematically illustrates a diagram of a CDS operation flow of the conventional CMOS image sensor.

Thus, the first row of the CMOS photosensitive array 100 is applied with the row reset signal shown in FIG. 11 at the first time t1, and is applied with the row readout signal shown in FIG. 12 at the second time t2. Between the first time t1 and the second time t2, the first row is exposed. In one embodiment, timing diagrams of the first row's reset step, exposure step and readout step are similar to the timing diagrams shown in FIG. 6. Similarly, timing diagrams of subsequent rows are similar as the timing diagrams shown in FIG. 6.

Referring to FIG. 10, at the second time t2, the third counting unit 211 also receives the readout start signal, so that the third counting unit 211 counts the horizontal signal XH1 and outputs the third count values "1", "2", "3" . . . .

The column address acquisition unit 213 outputs the row address signals of the first column, the second column, the third column . . . successively after receiving the above third count values.

The row selection 400 performs a strobe operation on each column of the CMOS photosensitive 100 according to the above column address signal, and finally outputs the column readout signal.

Heretofore, the image sensor completes related operations for each row and each column, and finally outputs an image frame.

Figure 13:
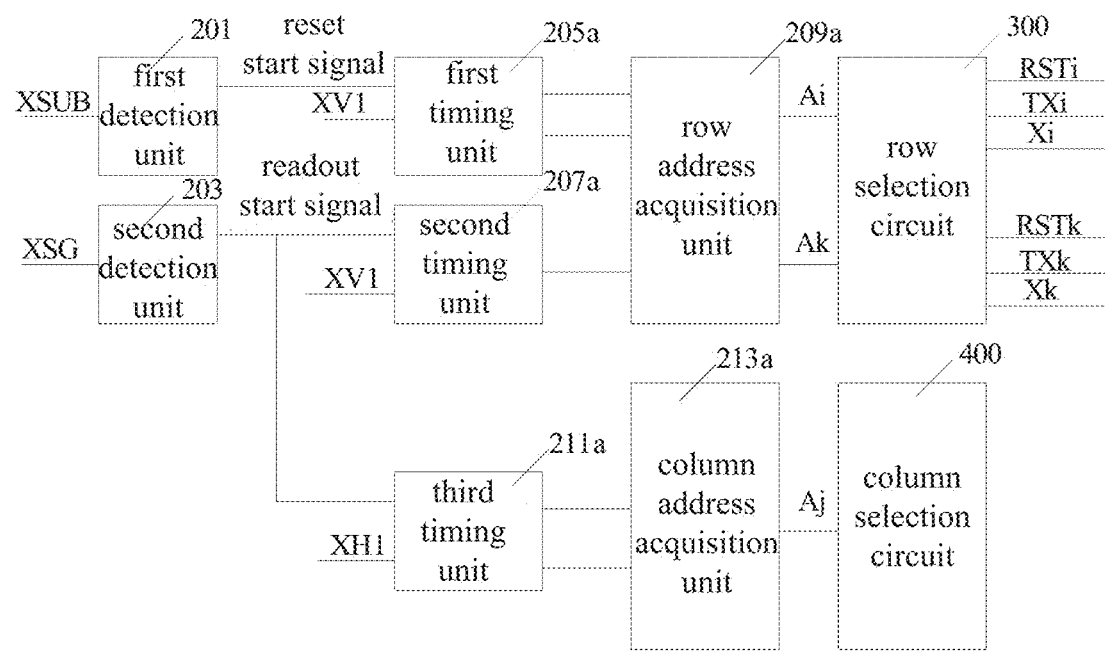
FIG. 13 schematically illustrates a structure diagram of a control signal conversion circuit according to another embodiment of the present disclosure.

FIG. 13 illustrates a structure diagram of the control signal conversion circuit shown in FIG. 8 according to another embodiment of the present disclosure. Referring to FIG. 13, the control signal conversion circuit includes a first detection unit 201, a second detection unit 203, a first timing unit 205a, a second timing unit 207a, a row address acquisition unit 209a, a third timing unit 211a and a column address acquisition unit 213a. For simplicity, the same or similar parts between this embodiment and the above embodiment are not described in detail herein. The different parts between this embodiment and the above embodiment are described below.

The first timing unit 205 is connected with the first detection unit 201, and is adapted for detecting the vertical transfer signal after receiving the reset start signal, outputting the first signal and starting timing after detecting a first vertical transfer signal, and stopping timing after detecting a second vertical transfer signal to obtain a first time interval, wherein the first signal and the first time interval is transmitted to the row address acquisition unit 209a.

The second timing unit 207a is connected with the second detection unit 203, and is adapted for detecting the vertical transfer signals after receiving the readout start signal, and outputting a second signal after receiving a first vertical transfer signal, wherein the second signal is transmitted to the row address acquisition unit 209a.

The row address acquisition unit 209a is connected with the first timing unit 205a and the second timing unit 207a, and is adapted for receiving the first signal, the first time interval and the second signal, generating a row reset control signal Ai according to the first signal and the first time interval, and generating a row readout control signal Ak according to the second signal and the first time interval.

Similarly as the above embodiment, after receiving the row reset control signal Ai and the row readout control signal Ak, the row selection circuit 300 outputs corresponding row reset signals RSTi, TXi and Xi, and corresponding row readout signals RSTk, TXk and Xk, respectively. The timing diagrams of the row reset signals are illustrated in FIG. 11, and the timing diagrams of the row readout signals are illustrated in FIG. 12.

Specifically, in this embodiment, the first signal is adapted for start the reset operation of the first row. Therefore, the first signal corresponds the row reset control signal of the first row in the row reset control signal Ai. The row reset control signal of the second row can be obtained by postponing the reset control signal of the first row a first time interval later, the row reset control signal of the third row can be obtained by postponing the reset control signal of the second row a first time interval later, and so on. Therefore, the row reset control signal Ai can be obtained.

Similarly as above, the second signal is adapted for starting the readout operation of the first row. Therefore, the second signal corresponds to the row readout control signal of the first row in the row readout control signal Ak. The row readout control signal of a subsequent row can be obtained by postponing the row readout control signal of its previous row a first time interval later.

It will be understood by those skilled in the art that, in other embodiments, the second timing unit 207a can be used to obtain the first time interval, and the first timing unit 205a only output the first signal. The present disclosure is not limited thereto.

The third timing unit 211 is connected with the second detecting unit 203, and is adapted for detecting the horizontal transfer signal after receiving the readout start signal, outputting the third signal and starting to time after detecting the first horizontal transfer signal, and stopping timing to obtain the second time interval after receiving a second horizontal transfer signal, wherein the third signal and the second time interval are transmitted to the column address acquisition unit 213a.

The column address acquisition unit 213a is connected with the third timing unit 211a, and is adapted for generating column address signals Aj according to the third signal and the second time interval.

Specifically, the third signal is adapted for start the readout operation of the first row. Therefore, the third signal corresponds to the column address signal of the first row. The column address signal of the second row can be obtained by postponing the column address signal of the first row a second time interval later. The column address signal of the third row can be obtained by postponing the column address signal of the second row a second time interval later, and so on. Therefore, the column address signal Aj can be obtained.

The structure and working principle of the column selection circuit 400 is similar to above embodiments, and is not described in detail herein.

An image processing system is also provided according to embodiments of the present disclosure. The image processing system includes any one of above image sensors. For simplicity, the image processing system is not described in detail herein.

In summary, the image sensor of the present disclosure includes: a control signal conversion circuit adapted for converting a first set of control signals for controlling CCD image sensors to a second set of control signals; a row selection circuit adapted for generating a row reset signal and a row readout signal according to a row reset control signal and a row readout control signal of the second set of control signals, so as to control a reset operation and a readout operation of each row of the CMOS photosensitive array; and a column selection circuit adapted for carrying out a strobe operation and a readout operation of each row of the CMOS photosensitive array according to a column address in the first set of control signals. Therefore, the CMOS image sensors can be used in a CCD system through the control signal conversion described above, and the CMOS image sensor can be a compatible substitute of the CCD image sensor.

In a specific application, for example, in the monitoring system in which CCD has a major share, the image sensor of the present disclosure can effectively reduce costs, because a CMOS image sensor kernel is used. Moreover, because the image sensor can match the CCD monitoring system, the image sensor also has advantages of the CCD system and effectively improves the system's availability.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. An image sensor, comprising: a Complementary Metal Oxide Semiconductor (CMOS) photosensitive array, a row selection circuit, a column selection circuit and a control signal conversion circuit,
    wherein the CMOS photosensitive array is electrically connected with the row selection circuit and the column selection circuit, and is adapted for converting optical signals to electrical signals;
    wherein the control signal conversion circuit is adapted for receiving a first set of control signals, and converting the first set of control signals to a second set of control signals, wherein the first set of control signals are adapted for driving a Charge-Coupled Device (CCD) photosensitive array and comprise at least a vertical transfer signal, a horizontal transfer signal, an electronic shutter signal and a readout clock signal, and the second set of control signals comprises at least a column address signal; a row reset control signal and a row readout control signal;
    wherein the row selection circuit is electrically connected with the control signal conversion circuit, and the row selection circuit is adapted for receiving the row reset control signal and the row readout control signal, generating a row reset signal according to the row reset control signal, and generating a row readout signal according to the row readout control signal, wherein the row reset signal is adapted for controlling a reset operation of each row of the CMOS photosensitive array, and the row readout signal is adapted for controlling a readout operation of each row of the CMOS photosensitive array; and
    wherein the column selection circuit is electrically connected with the control signal conversion circuit, and the column selection circuit is adapted for receiving the column address signal, performing a column strobe operation on the CMOS photosensitive array under control of the column address signal, and outputting a column readout signal.

2. The image sensor according to claim 1, wherein the CMOS photosensitive array is a four-transistor pixel array.

3. The image sensor according to claim 1, wherein the vertical transfer signal is a four-phase vertical transfer signal, and the horizontal transfer signal is a two-phase horizontal transfer signal.

4. The image sensor according to claim 3, wherein the control signal conversion circuit is adapted for converting one phase of the four-phase vertical transfer signal, one phase of the two-phase horizontal transfer signal, the electronic shutter signal and the readout clock signal of the first set of control signals to the second set of control signals.

5. The image sensor according to claim 1, wherein the control signal conversion circuit comprises a first detection unit, a second detection unit, a first counting unit, a second counting unit, a row address acquisition unit, a third counting unit and a column address acquisition unit,
  wherein the first detection unit is adapted for detecting the electronic shutter signal of the first set of control signals and outputting a reset start signal;
  wherein the second detection unit is adapted for detecting the readout clock signal of the first set of control signals and outputting a readout start signal;
  wherein the first counting unit is adapted for receiving the reset start signal and the readout start signal, counting the vertical transfer signal to obtain a first count value after receiving the reset start signal, and re-counting the vertical transfer signal after receiving the readout start signal;
  wherein the second counting unit is adapted for counting the vertical transfer signal to obtain a second count value after receiving the readout start signal, and re-counting the vertical transfer signal after receiving a next vertical readout start signal;
  wherein the row address acquisition unit is adapted for receiving the first count value and the second count value, outputting a row reset control signal according to the first count value, and outputting a row readout control signal according to the second count value;
  wherein the third counting unit is adapted for counting the horizontal transfer signal to obtain a third count value after receiving the readout start signal, and re-counting the horizontal transfer signal after receiving a next readout start signal; and
  wherein the column address acquisition unit is adapted for receiving the third count value, and outputting a column address signal according to the third count value.

6. The image sensor according to claim 1, wherein the row selection circuit is a row decoder or a shift register.

7. The image sensor according to claim 1, wherein the column selection circuit is a column decoder or a shift register.

8. The image sensor according to claim 1, wherein the control signal conversion circuit comprises a first detection unit, a second detection unit, a first timing unit, a second timing unit, a row address acquisition unit, a third timing unit and a column address acquisition unit,
  wherein the first detection unit is adapted for detecting the electronic shutter signal of the first set of control signals and outputting a reset start signal;
  wherein the second detection unit is adapted for detecting the readout clock signal of the first set of control signals and outputting a readout start signal;
  wherein the first timing unit is adapted for detecting the vertical transfer signal after receiving the reset start signal, outputting a first signal and starting to time after detecting a first vertical transfer signal, and stopping timing to obtain a first time interval after detecting a second vertical transfer signal;
  wherein the second timing unit is adapted for detecting the vertical transfer signal after receiving the readout start signal, and outputting a second signal after receiving a first vertical transfer signal;
  wherein the row address acquisition unit is adapted for receiving the first signal, the first time interval and the second signal, generating a row reset control signal according to the first signal and the first time interval, and generating a row readout control signal according to the second signal and the first time interval;
  wherein the third timing unit is adapted for detecting the horizontal transfer signal after receiving the readout start signal, outputting a third signal and starting to time after detecting a first horizontal transfer signal, and stopping timing to obtain a second time interval after detecting a second horizontal transfer signal; and
  wherein the column address acquisition unit is adapted for receiving the third signal and the second time interval, and generating a column address signal according to the third signal and the second time interval.

9. The image sensor according to claim 1, further comprising: an Analog to Digital Conversion (ADC) circuit adapted for converting the readout signal outputted by the column selection circuit to a digital signal.

10. An image processing system, comprising: the image sensor according to claim 1.

* * * * *